No. 832,368. PATENTED OCT. 2, 1906.
J. H. DRAKE.
VEHICLE WHEEL.
APPLICATION FILED DEC. 19, 1904.
2 SHEETS—SHEET 1.
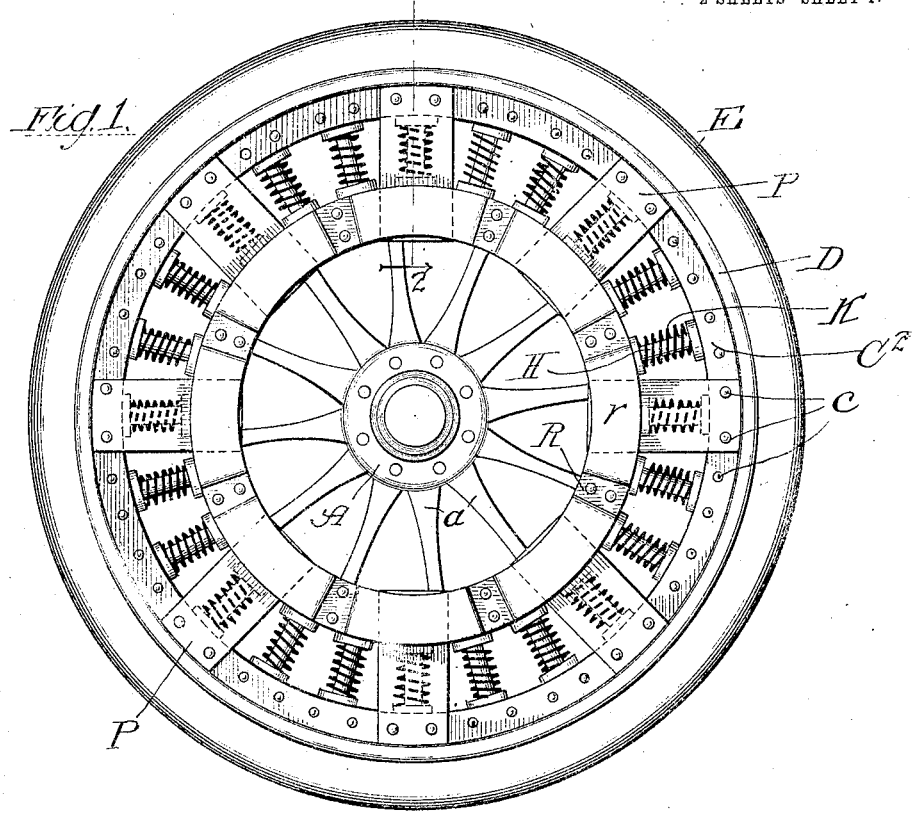
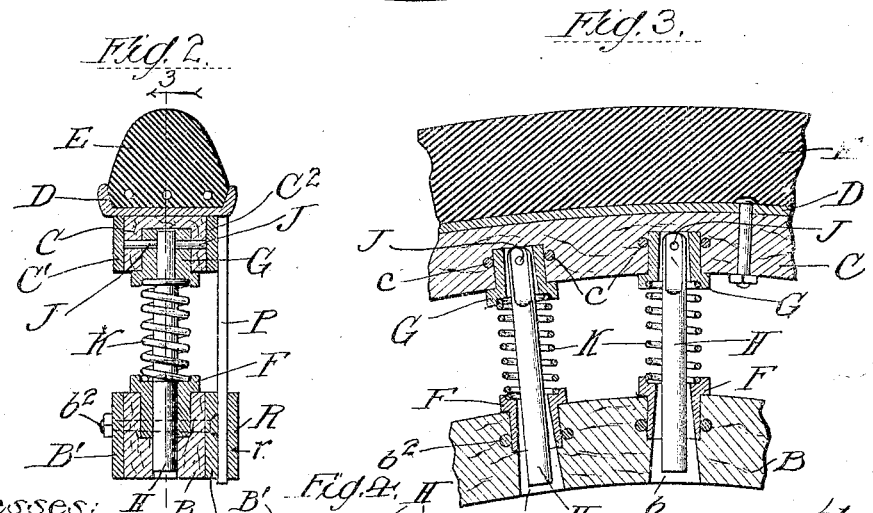
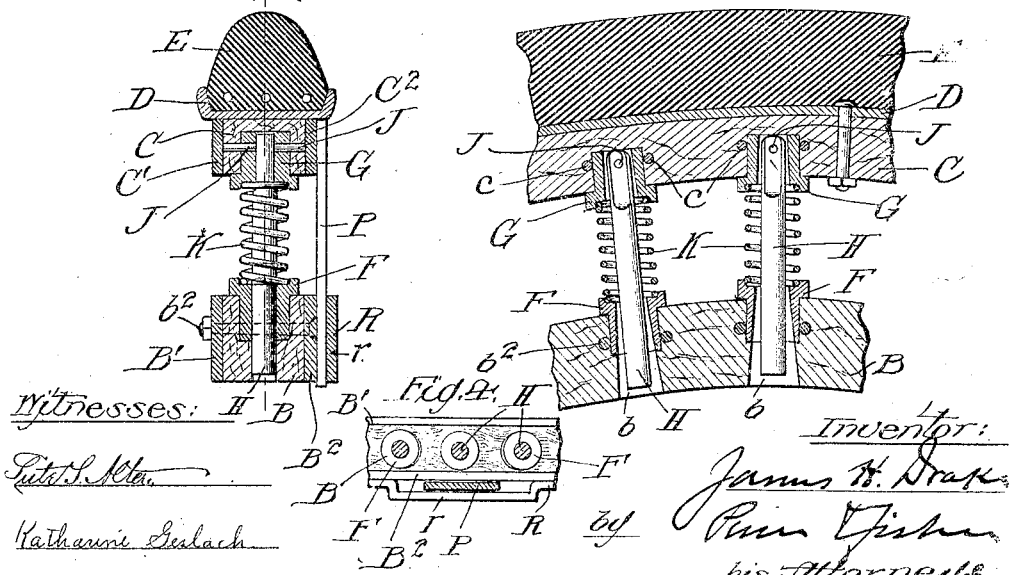
Witnesses:
Inventor:
James H. Drake
by
his Attorneys No. 832,368. PATENTED OCT. 2, 1906.
J. H. DRAKE.
VEHICLE WHEEL.
APPLICATION FILED DEC. 19, 1904.
2 SHEETS—SHEET 2.
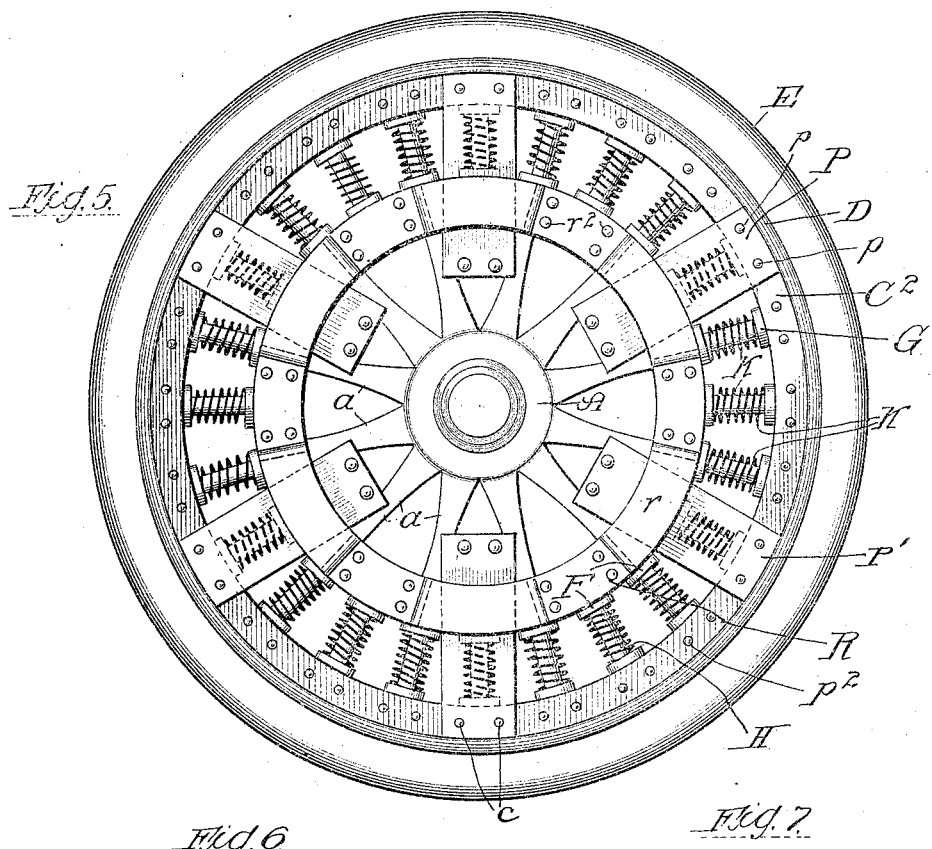
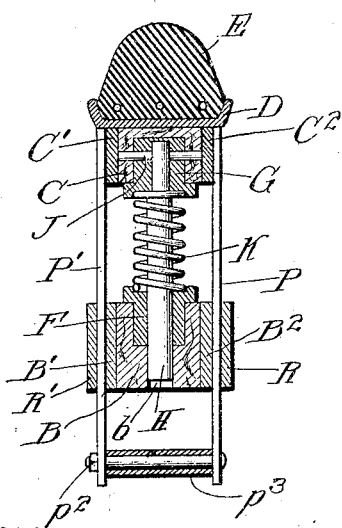
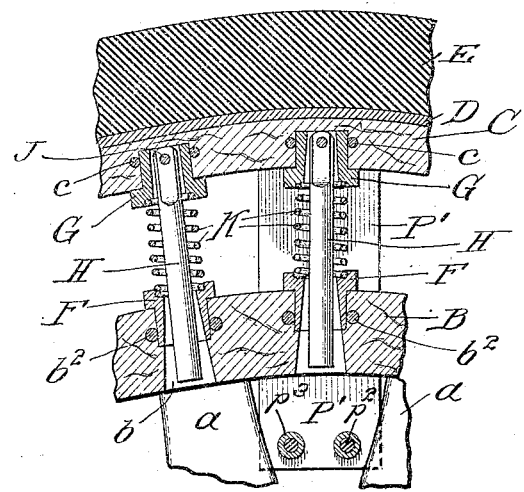
Witnesses:
Katharine Gerlach
Lillian Prentice
Inventor:
James H. Drake
By his Attorneys

UNITED STATES PATENT OFFICE.

JAMES HAINES DRAKE, OF MORGAN PARK, ILLINOIS, ASSIGNOR OF ONE-FOURTH TO JOSEPH J. SCHERMACK, OF CHICAGO, ILLINOIS.

VEHICLE-WHEEL.

No. 832,368.	Specification of Letters Patent.	Patented Oct. 2, 1906.

Application filed December 19, 1904. Serial No. 237,441.

*To all whom it may concern:*

Be it known that I, JAMES HAINES DRAKE, a citizen of the United States, residing at Morgan Park, county of Cook, and State of Illinois, have invented certain new and useful Improvements in Vehicle-Wheels, of which I do declare the following to be a full, clear, and exact description, reference being had to the accompanying drawings, forming part of this specification.

The present invention, while applicable to wheels adapted for various kinds of vehicles, has more especially for its object to provide an improved elastic wheel for use in heavy vehicles, such as automobiles, the wheels of which are subjected to severe strains and shocks.

The invention consists in the features of improvement hereinafter described, illustrated in the accompanying drawings, and particularly defined in the claims at the end of this specification.

Figure 1 is a view in side elevation of a vehicle-wheel embodying my invention. Fig. 2 is a view in vertical section on line 2 of Fig. 1. Fig. 3 is a view in central longitudinal section through a portion of the inner and outer parts of the wheel with the intermediate parts. Fig. 4 is a detail view in horizontal section, between the inner and outer rims or fellies. Fig. 5 is a view in side elevation, showing my invention as embodied in a wheel designed for very heavy work. Fig. 6 is a view in vertical section through a portion of the wheel shown in Fig. 5. Fig. 7 is a detail view similar to Fig. 3.

The hub portion A of the wheel and the spokes $a$, projecting therefrom, may be of any usual or suitable construction, the outer ends of the spokes $a$ being secured in usual manner to the inner rim or felly B, that is preferably formed of wood. Outside this inner rim or felly B and normally concentric therewith is the larger outer rim or felly C, that is encircled by the usual channel portion D, that carries the rubber tire E of the usual or other suitable construction. The inner rim or felly B is formed with a series of radial holes $b$, preferably flaring inwardly, as shown, and in the outer ends of these holes $b$ are fitted the metal sockets F, that will be secured to the felly B in any convenient way. At points opposite the radial sockets F similar sockets G are embedded in seats formed in the outer wooden rim or felly C, the bores of these sockets G being preferably flared inwardly, as shown. In the sockets G are held in manner free to swing slightly the upper ends of the guide-rods H, that are preferably flattened, and through these upper ends of the guide-rods H and as well also through the sockets G and the rim or felly C, pass the retaining-bolts J, that form the pivotal supports for the rods H. Each of the rods H is encircled by a coiled spring K, the ends of these springs K being held within seats formed in the opposing ends of the respective sockets F and G.

From the construction of parts thus far defined (which, however, does not constitute the present invention) it will be seen that the coiled springs K and the guide-rods H serve to hold the inner and outer rims or fellies B and C normally concentric; but under the weight of the vehicle and its load the yielding of the lower springs K permits a depression of the inner rim or felly B, which produces a corresponding eccentricity between the rims or fellies B and C. In order to enable the wheel to withstand the severe shocks and strains to which wheels of this type, and more particularly such as are designed for automobile service, are subjected, I reinforce the inner rim or felly B upon both sides with the metal brace bands or rings B' and B², that are securely bolted to the rim or felly B by the through-bolts or rivets $b^2$, arranged in close proximity around the rim or felly B. In order to enable the bolts or rivets $b^2$ to perform not merely the function of holding the brace bands or rings in position upon the inner rim or felly, but also to cause these bolts $b^2$ to aid in bracing the sockets F and prevent their working loose, I arrange the bolts or rivets $b^2$ so as to contact with or approximately contact with the sockets F. Hence any racking strain thrown upon the sockets F will be resisted by the bolts $b^2$. If desired, each of the sockets F may be formed with a peripheral groove or notch in which the adjacent bolts $b^2$ will lie. In like manner I reinforce the outer rim or felly C by metal brace bands or rings C' and C², that are connected to the rim or felly C by the through-bolts $c$, disposed around the rim or felly C, as shown. The through-bolts $c$ are arranged immediately next to the sockets G, so that these bolts $c$ perform the further function of resisting the strain that may be thrown upon the sockets, and hence prevent the sockets from working loose.

I have found with practice in wheels of the type above described, but which are not provided with the brace bands or rings reinforcing their inner and outer rims or fellies, that the severe lateral strain thrown upon the wheel, particularly when the vehicle is traversing sharp curves at a high speed, is liable to cause the splitting of the rims or fellies B and C and more particularly of the inner rim or felly B. This liability, however, is entirely avoided when the rims or fellies B and C are reinforced by the brace-rings in keeping with my invention.

I have found that in the use of a wheel of the above-described type—i. e., a wheel having inner and outer rims or fellies connected by guide-rods and carrying cushioned springs—the severe strain incident to the sudden stoppage of the vehicle, and more particularly to the reversal of its gearing, is apt to strain or break the parts because of the independence of revolution permitted by the connecting guide-rods. To overcome this objection and as well also to give greater lateral strength to the wheel, I have provided stay-bars between the outer and inner rims or fellies, the stay-bars being connected to the rims or fellies, preferably in the manner next to be described.

To the outer rim or felly C and preferably upon its brace ring or band C² are bolted or riveted in suitable number the radially-disposed stay-bars P. The free inner ends of these stay-bars P extend loosely through seats $r$ of a supplemental brace-ring R, that is bolted to the inner side of the rim or felly B. Preferably the supplemental brace ring or band R is formed by offsetting portions of it to form the seats or channels $r$, and these seats or channels preferably flare inward slightly and are sufficiently larger than the width of the stay-bars P to permit the free radial movement of such bars. Hence it will be seen that when the vehicle is suddenly checked or its direction of travel reversed the stay-bars P will come into action and will relieve the guide-rods H from severe shock and strain.

The wheel, as shown in Figs. 5 to 7 of the drawings, is more especially designed for very heavy automobile-work, and this wheel may be said to embody the preferred form of my invention. As in the construction hereinbefore described, the wheel comprises inner and outer rims or fellies B and C, the outer rim C being provided with the channel-iron D and rubber tire E. The inner and outer rims B and C are furnished with sockets F and G, between which extend the pivot-rods H, encircled by the coiled springs K. Upon each side of the inner rim B are bolted the brace bands or rings B' and B², and similarly to the sides of the outer rims or felly C are bolted the bands or rings C' and C². The bolts $b^2$, that pass through the inner rim, and the bolts $c$, that pass through the outer rim or felly, abut against the sockets F and G, respectively, as in the construction above described. Instead of providing one side only of the wheel with stay-bars, as in the construction of wheel above described, I provide stay-bars upon both sides of the wheel. These stay-bars P P' are preferably held at the outer rim by the through-bolts $c$, that pass through the outer rim C and the brace bands or rings C' and C². Upon each side of the inner rim or felly B and outside its brace bands or rings B' and B² are bolted the brace bands or rings R and R', that are formed with the seats $r$, through which pass the brace-bars P P'. The brace-rings R and R' are preferably held in place by bolts $r^2$, that pass through these rings and as well also through the inner felly and the brace-rings at the sides thereof. Preferably the inner ends of the brace-bars P P' are connected together by bolts $p^2$, these bolts passing through the inner ends of the brace-bars P P' and through spacing-sleeves $p^3$, as clearly shown in Fig. 6 of the drawings. By reference to Fig. 5 it will be seen that the bolts $p^2$ and sleeves $p^3$ extend in proximity to the sides of the wheel-spokes $a$, and consequently when any excessive strain is thrown upon the wheel, as by the too sudden starting or stoppage of the machine, the sleeves $p^3$ may contact with the sides of the spokes $a$, and thus aid in resisting such excessive strain. It will be noted that the brace-bars P P' are of considerable width in circumferential direction and that the seats or channels therefor in the guides are of slightly greater width cirumferentially, so that a certain amount of relative movement in circumferential direction is permitted between the inner and outer fellies; but on any excessive relative movement in circumferential direction of the inner and outer fellies the brace-bars would be brought against the ends of the guides to relieve the coiled springs and guide-rods H of excessive strain. It will also be noted that the guides $r$ of the brace-ring are of considerable width in radial direction and that the brace-bars P' and P'' fit snugly between the outer faces of the brace-rings B² and R, so as to securely hold the inner and outer rims or fellies against any relative movement in axial direction. By this arrangement it is impossible for the outer rim or felly to be thrown into a different plane from that of the inner rim or felly in going around curves and the like, so that the connecting guide-bolts and springs between the fellies are relieved from all strain in this direction.

It is manifest that the precise details of construction above set out may be varied without departure from the spirit of the invention and that features of the invention may be employed without its adoption as an entirety.

Having thus described my invention, what I claim as new, and desire to secure by Letters Patent, is—

1. In a vehicle-wheel comprising inner and outer rims or fellies with intermediate guide-rods, cushioned springs and sockets for such springs, the combination with the outer and inner rims or fellies, of continuous brace rings or bands secured to the opposite faces of said inner and outer rims or fellies.

2. In a vehicle-wheel comprising inner and outer rims or fellies and intermediate guide-rods, coiled springs and sockets for said springs, the combination with the inner and outer rims or fellies, of brace rings or bands secured by through-bolts to the opposite faces of said inner and outer rims or fellies.

3. In a vehicle-wheel comprising inner and outer rims or fellies with intermediate guide-rods, cushioned springs and sockets for such springs, the combination with one at least of said rims or fellies, of brace rings or bands secured to the opposite faces of said rim or felly, and through-bolts arranged near said sockets to aid in resisting the strain thrown thereon.

4. In a vehicle-wheel comprising inner and outer rims or fellies, intermediate guide-rods coiled springs and sockets for said springs intermediate between said rims or fellies, the combination with the inner and outer rims or fellies, of one or more stay-bars rigidly secured to the side of one of said rims or fellies and a guide or guides for the free end of said stay bar or bars secured to the side of the other rim or felly, said guide or guides having seats or channels of slightly-greater width than said stay-bars, substantially as described.

5. In a vehicle-wheel comprising inner and outer rims or fellies and intermediate guide-rods, coiled springs and sockets for said springs, the combination with the inner and outer rims or fellies, of flat stay-bars rigidly secured to the side of the outer rim or felly and a stay-ring provided with outwardly-flaring seats or channels of slightly-greater width than said stay-bars to receive said stay-bars and secured to the side of the inner rim or felly.

6. In a vehicle-wheel comprising inner and outer rims or fellies, intermediate guide-rods coiled springs and sockets for said springs intermediate between said rims or fellies, the combination with the inner and outer rims or fellies, of stay-bars secured to the opposite sides of the outer rim or felly, and guides for the free ends of said stay-bars secured to the opposite sides of the inner rim or felly, said guides having seats or channels of slightly-greater width than said brace-bars, substantially as described.

7. In a vehicle-wheel comprising inner and outer rims or fellies and coiled springs and sockets for said springs intermediate between said rims or fellies, the combination with the inner and outer rims or fellies, of stay-bars rigidly secured at their outer ends to opposite sides of the outer rim or felly, guides for the inner ends of said stay-bars secured to the opposite sides of the inner rim or felly, and means connecting the inner ends of said stay-bars at points between the spokes of the wheel.

8. In a vehicle-wheel comprising inner and outer rims or fellies, intermediate guide-rods and coiled springs and sockets for said springs in said rims or fellies, the combination with the inner and outer rims or fellies, of a plurality of flat stay-bars, rigidly secured to the side of one of said rims or fellies and overlapping the side of the other of said rims or fellies and flat guides for the free ends of said stay-bars secured to the side of the other rim or felly, said flat stay-bars and guides coöperating to prevent relative movement of the rims or fellies in axial direction, but permitting a slight movement thereof in circumferential direction, whereby the guide-rods and springs between the fellies would be relieved of excessive strain, substantially as described.

9. In a vehicle-wheel comprising inner and outer rims or fellies, intermediate coiled springs and guide-rods, and sockets for said springs and guide-rods in said rims or fellies, the combination with the inner and outer rims or fellies, of a series of flat stay-bars rigidly secured to the opposite sides of the outer rim or felly and a series of flat guides for the inner free ends of said stay-bars secured to the sides of the inner rim or felly, said stay-bars fitting snugly within said guides to hold said rims or fellies against relative movement in axial direction, but said guides having seats or channels of slightly-greater width than said stay-bars to permit a slight relative movement between said rims and fellies in circumferential direction, substantially as described.

10. In a vehicle-wheel comprising inner and outer rims or fellies, intermediate guide-rods and coiled springs and sockets for said springs and guide-rods in said rims or fellies, the combination with the inner and outer rims or fellies, of a series of flat guides secured to the side of said inner rim or felly and a series of flat stay-bars rigidly secured to the side of the outer rim or felly and projecting inwardly therefrom, the inner free ends of said stay-bars fitting snugly between the side of said inner rim or felly and said guides, whereby said rims or fellies are held against relative movement in axial direction, substantially as described.

11. In a vehicle-wheel comprising inner and outer rims or fellies, intermediate guide-rods and coiled springs and sockets for said springs and guide-rods in said rims or fellies, the combination with the inner and outer rims or fellies, of brace-bands secured to the opposite sides of said rims or fellies, supplemental bands secured to the sides of said inner rim or felly and having offset portions forming guides, and a series of flat stay-bars rigidly secured to the opposite sides of said outer rim or felly and projecting inwardly therefrom, the inner free ends of said stay-bars engaging offset guide portions of said supplemental bands and fitting snugly between said bands and the brace-bands secured to said inner rim or felly, whereby relative movement between the rims or fellies in axial direction is prevented, substantially as described.

12. In a vehicle-wheel of the class described, the combination with the inner and outer rims or fellies, of coiled springs arranged between said rims or fellies, guide-rods for said springs pivoted to one of said rims or fellies to swing in the plane of the wheel and slidably engaging the other of said rims or fellies, and stay-bars rigidly secured to one of said rims or fellies, the other of said rims or fellies having suitable guides engaging said bars, said guides being of slightly-greater dimension circumferentially than said bars, substantially as described.

JAMES HAINES DRAKE.

Witnesses:
 FRED GERLACH,
 LILLIAN PRENTICE.